(12) United States Patent
Shen

(10) Patent No.: US 8,419,413 B1
(45) Date of Patent: Apr. 16, 2013

(54) MOLD CORE POSITIONING DEVICE

(75) Inventor: Hung-Tsan Shen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/487,270

(22) Filed: Jun. 4, 2012

(30) Foreign Application Priority Data

Mar. 23, 2012 (TW) .............................. 101110150 A

(51) Int. Cl.
*B29C 43/32* (2006.01)
(52) U.S. Cl.
USPC ..... 425/406; 425/414; 425/468; 425/DIG. 10
(58) Field of Classification Search ................... 425/406, 425/414, 468, DIG. 10
See application file for complete search history.

(56) References Cited

U.S. PATENT DOCUMENTS 4,750,876 A * 6/1988 Lawson ........................ 425/406

* cited by examiner

*Primary Examiner* — Tim Heitbrink
(74) *Attorney, Agent, or Firm* — Altis Law Group, Inc.

(57) ABSTRACT

A mold core positioning device configured to position a mold core includes a base and a sleeve assembly. The base defines a receiving space. The sleeve assembly includes a hollow sleeve and a number of balls. A number of receiving holes are defined in a sidewall of the sleeve, and each of the receiving holes holds one of the balls, and each of the balls can rotate freely in a corresponding receiving hole. The sleeve is received in the receiving space, and the balls received in the sleeve is to hold the mold core in position with the balls contacting the mold core.

5 Claims, 3 Drawing Sheets

MOLD CORE POSITIONING DEVICE

BACKGROUND

1. Technical Field

The present disclosure relates to positioning devices, and particularly, to a mold core positioning device to position a mold core.

2. Description of Related Art

When manufacturing a mold core, the mold core is usually fixed to a positioning device by a screw, and the core contacts the sidewall of the positioning device directly. However, when mounted into the mold, the mold core is received in a sleeve assembly and contacts balls of the sleeve assembly, which means that the manufacturing environment of the mold core in the positioning device is different from the assembly environment of the core. Manufacturing accuracy may be degraded due to the above difference.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure will now be described in detail, with reference to the accompanying drawings.

Figure 1:
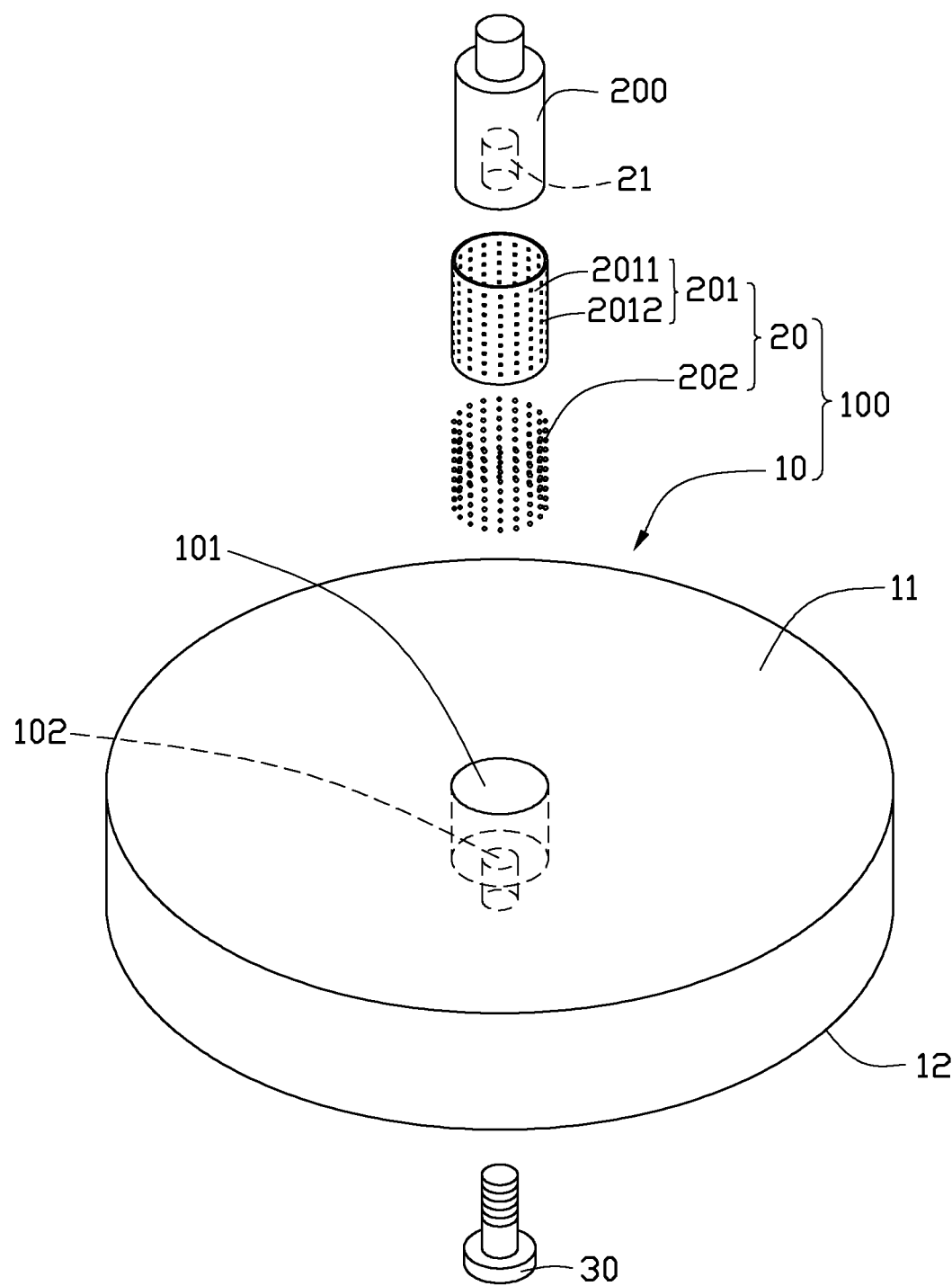
FIG. 1 is an exploded isometric view of a mold positioning device in accordance with an exemplary embodiment.
Figure 2:
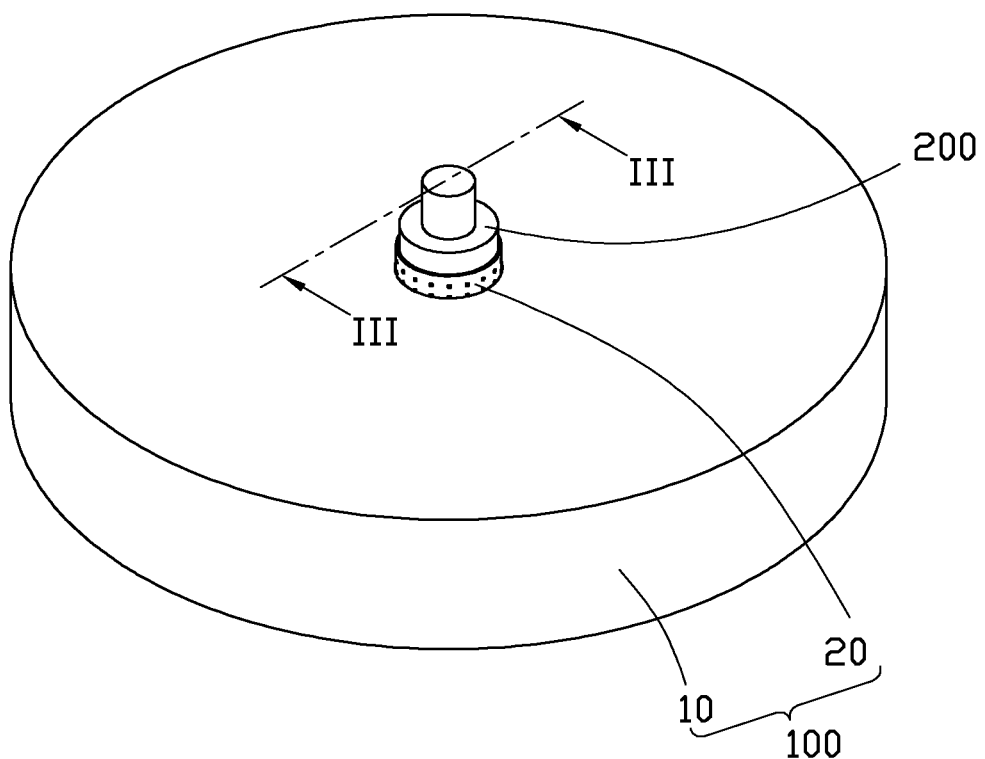
FIG. 2 is an assembled isometric view of the mold positioning device of FIG. 1.
Figure 3:
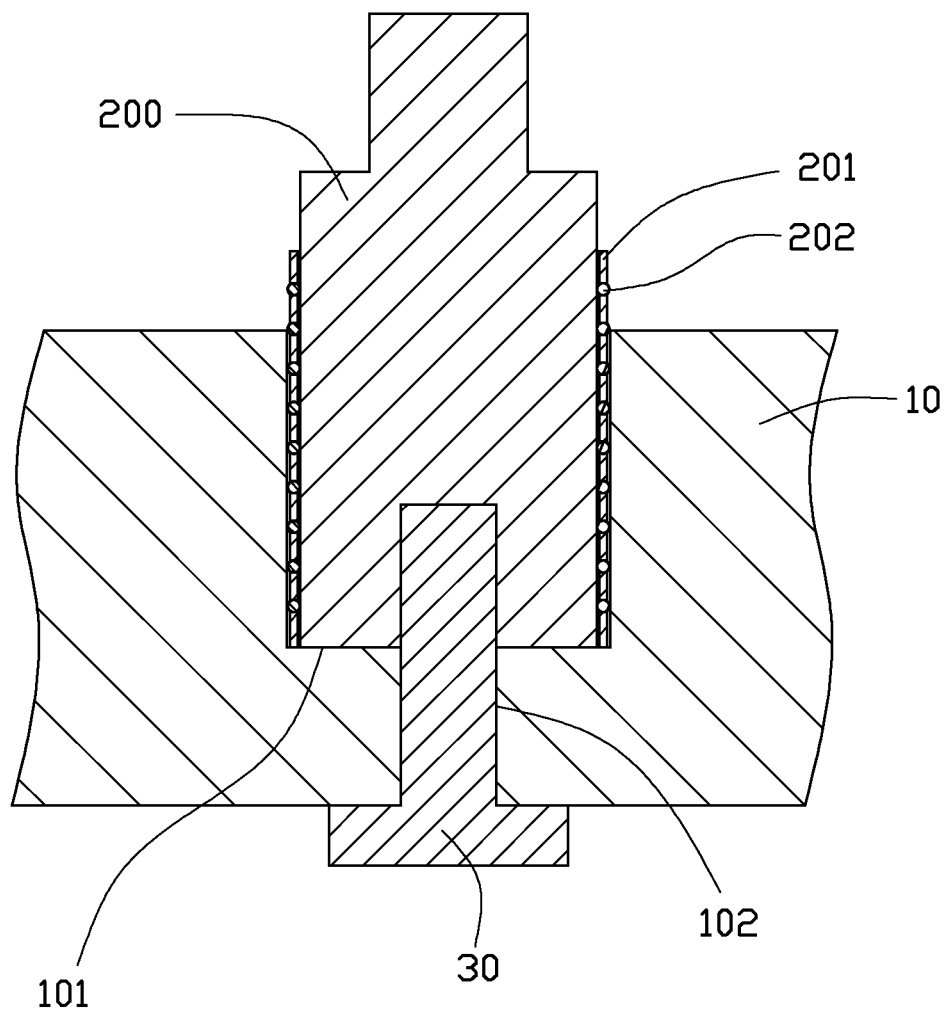
FIG. 3 is a cross-sectional view taken along line III-III of FIG. 2.

Referring to FIGS. 1-3, an embodiment of a mold core positioning device 100 is used to position a mold core 200. The mold core positioning device 100 includes a base 10 and a sleeve assembly 20. In this embodiment, the mold core 200 is cylindrical.

The base 10 is cylindrical and includes a top surface 11 and a bottom surface 12. A receiving space 101 is defined in the center of the top surface 11. In this embodiment, the receiving space 101 is a blind hole defined in the top surface 11. The diameter of the receiving space 101 is greater than that of the mold core 200, and the depth of the receiving space 101 is less than the height of the mold core 200. A through hole 102 is defined in the center of the bottom surface 12. The through hole 102 communicates with the receiving space 101, and the diameter of the through hole 102 is less than that of the receiving space 101. In this embodiment, the base 10 is made of aluminum.

The sleeve assembly 20 includes a sleeve 201 and a number of balls 202. The sleeve 201 is hollow and includes two open ends. The sleeve 201 includes a sidewall 2011, and a number of receiving holes 2012 defined in the sidewall 2011. Each of the receiving holes 2012 holds a ball 202 which can rotate freely in the corresponding receiving hole 2012. In this embodiment, the inner diameter of the sleeve 201 is equal to the diameter of the mold core 200, and the outer diameter of the sleeve 201 is equal to the diameter of the receiving space 101. The sleeve assembly 20 is fixed in the receiving space 101 to receive the mold core 200 in position with the balls 202 contacting the mold core 200. In this embodiment, the sleeve assembly 20 is fixed to the receiving space 101 by adhesives.

The bottom of the mold core 200 defines a threaded hole 21 corresponding to the through hole 102. When the mold core 200 is received in the sleeve assembly 20 within the base 10, the threaded hole 21 is aligned with the through hole 102. A screw 30 extends through the through hole 102 and is screwed into the threaded hole 21 to fix the mold core 200 to the mold core positioning device 100. When the mold core 200 is fixed to the mold core positioning device 200, the balls 202 hold the mold core 200 in position the same way as the mold core 200 will mounted into a mold, thus the mold core 200 can be processed and calibrated in a situation that is the same as when it will be applied in a mold. As a result, the mold core 200 can be made with greater accuracy.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A mold core positioning device for positioning a mold core, comprising:
a base defining a receiving space; and
a sleeve assembly comprising a sleeve and a plurality of balls, the sleeve comprising a sidewall defining a plurality of receiving holes, and each of the receiving holes holding one of the plurality of balls, each of the plurality of balls being able to rotate freely in the corresponding receiving hole;
wherein the sleeve assembly is received in the receiving space, and the balls received in the sleeve hold the mold core inserted into the sleeve in position with the balls contacting the mold core.

2. The mold core positioning device as described in claim 1, wherein the base is cylindrical, and comprises a top surface and a bottom surface, the receiving space is a blind hole defined in the top surface, a diameter of the receiving space is greater than the diameter of the mold core, and a depth of the receiving space is less than a height of the mold core.

3. The mold core positioning device as described in claim 2, wherein the bottom surface defines a through hole communicating with the receiving space, and a diameter of the through hole is far less than the diameter of the receiving space, when the mold core is received in the sleeve within the receiving space, the through hole is aligned with a threaded hole defined in the mold core, a screw extends through the through hole and is screwed into the threaded hole to fix the mold core to the mold core positioning device.

4. The mold core positioning device as described in claim 2, wherein an inner diameter of the sleeve is equal to a diameter of the mold core, and an outer diameter of the sleeve is equal to a diameter of the receiving space.

5. The mold core positioning device as described in claim 4, wherein the sleeve assembly is fixed to the receiving space by adhesives.

* * * * *